United States Patent [19]

Clayfield et al.

[11] Patent Number: 4,524,000
[45] Date of Patent: Jun. 18, 1985

[54] PROCESS FOR THE REMOVAL OF OIL FROM AN OIL-IN-WATER DISPERSION

[75] Inventors: Eric J. Clayfield; Arnold G. Dixon; Richard J. L. Miller, all of Chester, United Kingdom

[73] Assignee: Shell Oil Company, Houston, Tex.

[21] Appl. No.: 579,925

[22] Filed: Feb. 14, 1984

[30] Foreign Application Priority Data

Feb. 17, 1983 [GB] United Kingdom ............... 8304389

[51] Int. Cl.$^3$ ............................................. B01D 17/02
[52] U.S. Cl. .................................. 210/649; 210/708; 210/508; 210/DIG. 5
[58] Field of Search ............ 210/649, 680, 693, 708, 210/799, DIG. 5, 350, 505, 508

[56] References Cited

U.S. PATENT DOCUMENTS

| 3,562,153 | 2/1971 | Tully et al. ......................... 210/680 |
| 3,728,208 | 4/1973 | Whittington et al. ............. 210/680 |
| 4,199,447 | 4/1980 | Chambers et al. ................. 210/638 |
| 4,374,734 | 2/1983 | Newcombe ......................... 210/708 |
| 4,481,113 | 11/1984 | Canevari ............................ 210/680 |

FOREIGN PATENT DOCUMENTS

| 53-54177 | 5/1978 | Japan ................................. 210/708 |
| 2018610 | 10/1979 | United Kingdom . |
| 2038300 | 7/1980 | United Kingdom . |

Primary Examiner—Peter Hruskoci

[57] ABSTRACT

In a process for the separation of oil from an oil-in-water dispersion by coalescence followed by separation of coalesced drops, coalescence is carried out at the surface of a solid material manufactured by contacting a solid material having active H atoms in surface groups or a polyolefin in the presence of water with a compound $Si(R^1)(R^2)(R^3)(R^4)$, in which $R^1$ is a (cyclo)aliphatic group containing one or more amino groups, $R^2$ a hydrolyzable group and $R^3$ and $R^4$ a hydrolyzable or non-hydrolyzable organic group or a hydrolyzable atom.

9 Claims, No Drawings

PROCESS FOR THE REMOVAL OF OIL FROM AN OIL-IN-WATER DISPERSION

BACKGROUND OF THE INVENTION

The invention relates to a process for the separation of two liquids by passing a dispersion of negatively charged droplets of a liquid in an aqueous liquid along the surface of a solid material, thus forming coalesced dispersed liquid and, after the aqueous liquid has left the solid material, separating coalesced dispersed liquid from the aqueous liquid. The invention also relates to a process for the manufacture of such a solid material. The invention further relates to an apparatus for said separation and containing said solid material.

In the industry use is frequently made of a process for the above mentioned separation, for example, of oil from a dispersion thereof in an aqueous liquid. Usually, these oil droplets are negatively charged. Such an oil may be a hydrocarbon oil, for example, crude mineral oil, gas oil or kerosene, or a vegetable oil, for example, soya bean or cotton seed oil. Examples of such dispersions are oil-contaminated cooling water, tanker washings containing crude mineral oil and water used for product treatment in oil refineries. Before such used water can be released to rivers, canals or the sea, it is necessary to remove dispersed oil therefrom.

By passing said dispersion along the surface of a suitable solid material the dispersed droplets tend to coalesce, forming larger drops, and these larger drops can more easily be removed from the aqueous liquid by, for example, gravity separation. However, it has sometimes not been found easy to obtain a satisfactory coalescence efficiency. The coalescence efficiency, expressed in a percentage, is defined herein as:

$$\frac{F - P}{F} \times 100$$

in which F is the dispersed amount of liquid in the aqueous liquid upstream of the surface of the solid material and P is the dispersed amount of liquid in the aqueous liquid downstream of the surface of the solid material, after removal of the coalesced dispersed liquid.

An example of a process having an efficiency susceptible of improvement is described in British patent specification No. 2,038,300. By this known process the average dispersed amount of oil was reduced from 33 mg/l to 9 mg/l, which represents an efficiency of only 73%. The Applicants have found that during longer term continuous operation the bed progressively becomes blocked with liquid originating from the dispersed liquid, so that the operation has to be halted. In this known process the fibers are excessively wetted by liquid originating from the dispersed liquid, act primarily as a filter and poorly release coalesced liquid originating from the dispersed liquid; in such a situation a high backpressure is observed. The backpressure is defined as the difference between the pressure upstream of the coalescer bed and that downstream of the coalescer bed. Moreover, the solid material being used in this known process is manufactured in two steps and each of these steps is fairly complicated. In the first step, an inorganic solid containing surface hydroxyl groups is reacted with certain silane coupling agents, and in the second step the product formed in the first step is reacted at elevated temperature with an N-substituted imide of an alkenyl substituted dicarboxylic acid. Both steps require long reaction times—a number of hours—and are carried out in hydrocarbon solvents. Furthermore, it is recommended that said alkenyl groups be long, having a molecular weight in the range 300 to 2100.

A process has now been found by which the dispersed negatively charged droplets can be removed with a considerably improved coalescence efficiency which can be retained for a very long time. For this purpose solid material is used which can be prepared in a considerably simpler manner.

SUMMARY OF THE INVENTION

Accordingly, the invention provides a process for the separation of two liquids by passing a dispersion of negatively charged droplets of a liquid in an aqueous liquid along the surface of a solid material, thus forming coalesced dispersed liquid and, after the aqueous liquid has left the solid material, separating coalesced dispersed liquid from the aqueous liquid, in which process the solid material has been manufactured by contacting a solid material having active hydrogen atoms in surface groups or a polyolefin in the presence of water with a compound of the general formula (I):

in which $R^1$ represents an aliphatic or cycloaliphatic group containing at least one substituted or unsubstituted amino group, $R^2$ a hydrolyzable group and each of $R^3$ and $R^4$ a hydrolyzable or not-hydrolyzable organic group or a hydrolyzable atom.

DESCRIPTION OF THE INVENTION

By means of the process according to the present invention the negatively charged droplets are usually removed with a coalescence efficiency or more than 95% and in many cases to a level below 5 parts per million by volume (ppmv).

The inventors have found that the very fact of the presence of amino groups in compounds of the general formula I is sufficient for obtaining a highly efficient coalescence, the presence of alkenyl substituted dicarboximido groups such as those described in the British Patent Application No. 2,038,300A, not being necessary. This might be explained as follows. However, the invention is not intended to be restricted in any way by this explanation.

In an aqueous environment, amines are protonated according to equation (A):

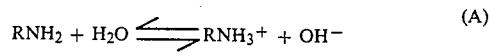

in which R represents an organic group. When the solid material being used in the process according to the present invention is immersed in an aqueous liquid having a pH below, for example, 9, equation (A) is pushed to the right-hand side. The result is the production of a substantial number of positively charged quaternary ammonium groups which impart a positive charge to the surface of the solid material. As the dispersed droplets are negatively charged, the solid material attracts these droplets more strongly. Aliphatic amino groups have a dissociation constant of, for example, $4 \times 10^{-4}$, so that the degree of association with hydrogen ions to form the quaternary ammonium group is about 97% at a pH of 9.

At a pH lower than 9, the amino groups are even better ionized and this is responsible for the efficient coalescence; they are fully ionized at a pH of 6.

In formula I, $R^1$ preferably represents an aliphatic group containing not more than 5 substituted or unsubstituted amino groups. Furthermore, long alkenyl groups need not be present at all in the compounds of the general formula I, so that these compounds can have much smaller molecules than those used according to the prior art process discussed hereinbefore. It is therefore preferred that $R^1$ contains in the range of from 1 to 15 carbon atoms. The group present in $R^1$ between the silicon atom and the first nitrogen atom, seen from the silicon atom is suitably an alkylene group and suitably has in the range of from 1 to 10 and particularly of from 1 to 5 carbon atoms. Examples of alkylene groups are methylene, ethylene, trimethylene, tetramethylene, pentamethylene, methylethylene (also named "propylene"), ethylethylene, 1-methyltrimethylene, 2-methyltrimethylene, 1,1-dimethylethylene, 1-methyltetramethylene, 1-ethyltrimethylene, 2-methyltetramethylene, 1,1-dimethyltrimethylene, 2-propylethylene and 2,2-dimethyltrimethylene groups. Very good results have been obtained with trimethylene groups. According to a preferred embodiment $R^1$ represents a 3-aminopropyl group.

Any substituted amino group or groups present in $R^1$ may form secondary or tertiary amines. One hydrogen atom or both hydrogen atoms of the amino group or groups may be substituted, for example by hydrocarbyl groups, such as an alkyl group; these alkyl groups suitably have up to 5 carbon atoms.

According to a particularly preferred embodiment of the present invention two or more amino groups in $R^1$ are separated from each other by means of alkylene groups. It has been found that this embodiment allows a considerably longer use of the solid material, the surface thereof changing very little with time. As alkylene groups between amino groups the examples of alkylene groups mentioned hereinbefore may be used; very good results have been obtained with ethylene groups.

Preferably, $R^1$ represents an N-(2-aminoethyl)-3-aminopropyl group. The following structure gives an idea of how this group may be attached to a silicon-containing solid material:

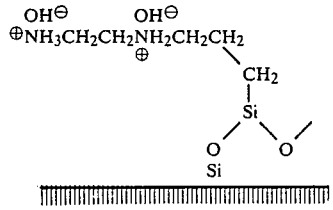

The shaded area below the lower silicon atom represents the solid material. However, the invention is not intended to be restricted in any way by this structure representing a surface group.

$R^3$ and $R^4$ may represent hydrocarbyl groups, for example, alkyl, cycloalkyl or aryl groups or alkyl-substituted aryl or aryl-substituted alkyl groups. Preferably, $R^3$ and $R^4$ represent hydrolyzable groups.

$R^2$, $R^3$ and $R^4$ may be different, but they are preferably the same hydrolyzable groups. Examples of hydrolyzable groups are halogen atoms, i.e., fluorine, chlorine, bromine and iodine atoms, and hydrocarbyloxy groups. The latter groups preferably have not more than 6 carbon atoms and are suitably alkoxy, aroxy or cycloalkoxy groups. Suitable groups are methoxy, ethoxy, phenoxy and cyclohexoxy groups; methoxy and ethoxy groups are preferred.

The solid material having active hydrogen atoms in surface groups may be inorganic or organic or may be a mixture of inorganic and organic materials. Examples of inorganic materials are silicate glass, silica (for example silica gel), alumina, titania, zirconia, sepiolite, anthracite, asbestos and zeolitic molecular sieves.

Among the polyolefins polypropylene is preferred, particularly polypropylene that has been stabilized with compounds containing active hydrogen atoms, for example with phenols.

The solid material being used in the process according to the present invention may, for example, comprise particles or may be plates in a parallel plate interceptor. The particles suitably have a low specific surface area, preferably below 25 $m^2/g$ and particularly below 5 $m^2/g$. The particles may be present as, for example, fibers, spheres, cylinders, saddles, rings or flakes. Very good results have been obtained with fibers, particularly with glass fibers and polypropylene fibers. The solid material is preferably present as a fixed bed of particles and particularly as a layer of fibers. The particles may be present in one fixed bed or in two or more fixed bed in series.

Suitable dimensions of the particles and the bulk density and height of a fixed bed of particles can easily be determined by routine experiments. Suitably, the average diameter of fibers is between 0.5 and 50 $\mu m$ and the bulk density of a layer of fibers between 25 and 200 g/l and the height of such a layer between 0.5 and 15 cm. The dispersion is suitably passed through a fixed bed of particles with a linear velocity between 0.05 and 2 cm/s.

The process according to the present invention is particularly effective for the removal of oil droplets from so-called "secondary emulsions", i.e., emulsions in which the dispersed droplets have a size of below 10 $\mu m$.

The process according to the present invention has as a further advantage that it continues to give excellent coalescence efficiencies in the presence of anionic surface active agents up to a concentration of usually $5 \times 10^{-4}$ Mol/l; at concentrations higher than this value the efficiency begins to decline. This tolerance towards anionic surface active agents is higher than that shown by the solid material used in the process according to British patent specification No. 2,038,300. The concentration of $5 \times 10^{-4}$ mol/l is greater than that found in most practical aqueous liquids subject to accidental contamination. In contrast, in the presence of a cationic surfactant—which confers a positive charge on the droplets—the polyolefin as such (which has not been contacted in the presence of water with a compound of the general formula I) or the solid material as such, having active hydrogen atoms in surface groups, gives higher coalescence efficiencies than the polyolefin or solid material that has been contacted in the presence of water with a compound of the general formula I. Cationic surfactants should therefore be absent or be present in such a low concentration that the dispersed droplets are still negatively charged.

The invention also provides a process for the manufacture of a solid material as described hereinbefore, which process comprises contacting a polyolefin or a solid material having active hydrogen atoms in surface groups in the presence of water with a compound of the general formula I and drying the material thus obtained at a temperature between 50° C. and 150° C. The word "water" denotes water in any water-containing liquid. This process can simply be carried out by contacting the solid material in question in an aqueous medium with a compound of the general formula (I) at a temperature between, for example, 10° and 50° C. and for a time of less than, for example 30 min. Usually, ambient temperature and a time of not more than 10 min are sufficient. The aqueous medium suitably contains at least 0.0001% by weight of the compound of the general formula I. Very good results are obtained throughout the range of 0.0001-2% by weight. This is very advantageous, because the use of dilute solutions, for example containing in the range of from 0.0001 to 0.01% by weight of the compound of the general formula I, involves a very low consumption of amine. After contacting the solid material with the aqueous medium excess liquid may be removed and the solid material is dried, for example for a period between 0.5 and 15 hours. It is an advantage that drying in this temperature range can be carried out at atmospheric pressure.

The invention further relates to an apparatus for the separation of negatively charged droplets from an aqueous liquid, which droplets form a dispersion in the aqueous liquid, which apparatus comprises an inlet for aqueous liquid, a layer of material manufactured according to the present invention, and a discharge for aqueous liquid. During passage of the aqueous liquid through the layer the openings between the fibers may gradually become smaller, because solid contaminants, if present in the liquid, remain in the openings between the fibers. In particular, negatively charged particles are easily attracted by the quaternary ammonium groups present on the fibers. This implies that the layer of fibers gradually becomes clogged by solid particles, thus decreasing the effectiveness of the layers of fibers. As a result thereof the layer of fibers must be replaced, which involves loss of time and extra cost. The layer of material promoting coalescence of the negatively charged droplets is therefore suitably a layer of fibers held under pressure by walls provided with openings, of which walls at least two are displaceable relative to each other and ends of the fibers are so secured to a displaceable wall, that the fibers can stretch themselves when the walls are displaced away from each other. This apparatus enables the layer of fibers to be cleaned in a simple manner, so that replacement of the layer of fibers is no longer necessary. Such an apparatus is described in British patent spacification No. 2,018,610.

The following Examples further illustrate the invention.

The experiments described in comparative experiments A-P and examples 1-10 were carried out with a coalescer bed consisting of glass fibers. The fibers had previously been heated in air to a temperature of 500° C. for one hour to remove the resin binders applied by the manufacturer. Then, they were cleaned in chromic acid for 2 hours, followed by rinsing with distilled water. The glass fibers thus obtained had surface hydroxyl groups and are referred to hereinafter as "clean fibers". The coalescer bed was circle-cylindrical, with a height of 1 cm (unless otherwise stated) and a width of 3 cm. The bed was provided at the bottom with a fixed wall (diameter 3 cm) and at the top with a displaceable wall (diameter 3 cm). The fixed wall and the displaceable wall were provided with a circular inlet and a circular outlet for aqueous liquid, both having a diameter of 2 cm and both arranged concentrically with the central axis of the coalescer bed. The glass fibers had a diameter of 7.5 $\mu$m (surface area of 0.205 m$^2$/g) and the coalescer bed a bulk density of 109.5 g/l (porosity of 95.8%), the latter four values unless otherwise stated.

The experiments were carried out with a dispersion of kerosene in distilled water. Prior to emulsification, surface active agents were removed from the kerosene by percolating twice through alumina/silica powder. The number and the size of the droplets dispersed in the water were measured by a Coulter counter, allowing analysis of a dispersion over the size range 2-40 $\mu$m in one sampling tube and 0.6-12 $\mu$m in the other sampling tube. Thus, volume/droplet diameter distributions were obtained. All starting dispersions had sharp cut-offs at the upper end of the droplet size distributions in the range of 12-15 $\mu$m, indicating no appreciable number of droplets above this size. About 5% of the volume of the kerosene was contained in droplets of less than 2 $\mu$m. The maximum in each distribution is in the range of 7-9 $\mu$m (unless otherwise stated).

The dispersions were passsed in upward direction through the coalescer bed at a rate of 25 cm$^3$/min (unless otherwise stated), which corresponds to a linear velocity of 0.14 cm/s through the 2 cm inlet. The coalesced kerosene risen as drops to the surface of the coalescer bed was separated from the aqueous liquid and the product aqueous liquid thus obtained was analyzed with the Coulter Counter, as described hereinbefore. The results are expressed in the coalescence efficiency, which was measured after 30 min of operation.

COMPARATIVE EXPERIMENT A

Clean fibers were used. The dispersion fed to the coalescer bed contained 107 ppmv of dispersed kerosene. The coalescence efficiency was only 51.2%. The maximum in the volume/droplet diameter distribution of the product dispersion was moved to smaller droplet sizes, namely 3-5 $\mu$m, and very little kerosene remained in droplets greater than 8 $\mu$m. No appreciable coalescence of droplets smaller than about 3 $\mu$m had occurred.

COMPARATIVE EXPERIMENT B

Clean fibers contacted with dimethyldichlorosilane were used. For this purpose, the clean fibers were immersed for 2 min at ambient temperature in a solution of dimethyldichlorosilane in 1,1,1-trichloroethane (1 g/100 ml). Then, the fibers were slowly withdrawn from the solution over 0.5 min in a current of air, rinsed with distilled water and dried in air. The dispersion fed to the coalescer contained 125 ppmv of dispersed kerosene. The coalescence efficiency was only 59.2%. The volume/droplet diameter distribution of the product dispersion was about the same as that of comparative experiment A.

COMPARATIVE EXPERIMENT C

Clean fibers contacted with 3-(heptafluoroisopropoxy)propyltrichlorosilane were used. This silane was contacted with the fibers in the same manner as described for dimethyldichlorosilane in comparative experiment B. The dispersion fed to the coalescer contained 98 ppmv of dispersed kerosene. The coalescence efficiency was only 55.9%. The volume/droplet diameter distribution of the product dispersion was about the same as that of comparative experiment A.

COMPARATIVE EXPERIMENT D

Clean fibers contacted with (3-mercaptopropyl)-trimethoxysilane were used. Sufficient glacial acetic acid was added to 150 ml of distilled water to adjust the pH to 4.5. Then, the silane (2 ml) was added. The solution was stirred at ambient temperature for 30 min with a magnetic stirrer while the methoxy groups of the silane hydrolyzed and the solution became homogeneously clear. The glass fibers were immersed for one hour and when withdrawn from solution exhibited a wetting film. Finally the fibers were dried for one hour at a temperature of 120° C. The dispersion fed to the coalescer contained 100 ppmv of dispersed kerosene. The coalescence efficiency was only 51.0%. The volume/droplet diameter distribution of the product dispersion was about the same as that of comparative experiment A.

EXAMPLE 1

Clean fibers contacted with 3-aminopropyltriethoxysilane were used. Discs of clean fibers were placed on a glass filter paper (Whatman GF/A) in a Buchner funnel (inside diameter 10 cm) fitted with a Grade 1 porosity glass sinter. The funnel was fixed into a Buchner flask connected to a water-driven ejector. A solution (1% volume) of 3-aminopropyltriethoxysilane in distilled water was added to the funnel (without application of sub-atmospheric pressure) so that the thin sections of fiberglass mat were immersed for 2 min. Then sub-atmospheric pressure was applied so that the discs were largely freed of excess liquid. The discs were removed from the funnel and baked at a temperature of 120° C. for one hour.

The dispersion fed to the coalescer contained 78 ppmv of dispersed kerosene. The coalescence efficiency was 89.8%. The maximum in the volume/droplet diameter distribution of the product dispersion was decreased to about 2.5 $\mu$m and practically no kerosene droplets having a diameter between 4 and 8 $\mu$m were present. The test had to be curtailed after 170 hours of continuous operation because of a very rapid buildup in back pressure. It was only after 70 hours of continuous operation that release of coalesced oil droplets was observed.

EXAMPLE 2

Clean fibers contacted with N-(2-aminoethyl)-3-aminopropyltrimethoxysilane were used. This silane was contacted with the fibers in the same manner as described for 3-aminopropyltriethoxysilane in Example 1. The dispersion fed to the coalescer contained 80 ppmv of dispersed kerosene. The coalescence efficiency was 97.8%.

EXAMPLES 3–5

Example 2 was repeated in entirety, except that the coalescer bed had a height of 2 cm and a bulk density of 141.5 kg/m$^3$ (porosity 94.6%). The dispersions fed to the coalescer bed contained 80 ppmv of dispersed kerosene. The three different linear velocities used and the coalescence efficiencies found are presented in Table 1.

TABLE 1

| Example | Linear flow velocity cm/s | Coalescence Efficiency % |
|---|---|---|
| 3 | 0.14 | 97.8 |
| 4 | 0.56 | 96.3 |
| 5 | 0.84 | 95.3 |

Practically no droplets having a diameter greater than 8 $\mu$m were present in the product dispersion withdrawn from the bed. Four successive 2-liter batches of dispersion were passed through the bed at a linear flow velocity of 0.84 cm/s without deterioration in product clarity and brightness, as judged visually.

EXAMPLE 6

Example 5 was repeated in entirety, except that the coalescer bed had a height of 1 cm. The coalescence efficiency was the same within the experimental error.

COMPARATIVE EXPERIMENTS E–H

Comparative Experiment E was carried out without and comparative experiments F, G and H each with a different concentration of sodium dodecylsulphate (SDS) in the dispersion. These four experiments were repetitions of comparative experiment A, except that the glass fibers had an average diameter of 1.5 $\mu$m (surface area of 1.026 m$^2$/g) and that the coalescer bed had a bulk density of 23.8 g/l (porosity of 99.2%). The concentration of SDS, the droplet diameter (maximum in the volume/droplet diameter distribution) and the amount of kerosene dispersed in the feed are shown in table 2. Table 2 also presents the efficiencies.

TABLE 2

| Comparative Experiment | Concentration SDS, mol/l | Average droplet diameter in feed $\mu$m | Kerosene dispersed in feed ppmv | Coalescence efficiency % |
|---|---|---|---|---|
| E | 0 | 7.5 | 80 | 94.9 |
| F | 10$^{-6.5}$ | 7.5 | 400 | 78 |
| G | 10$^{-5.0}$ | 5.0 | 350 | 50 |
| H | 10$^{-2.5}$ | 3.5 | 310 | 33 |

EXAMPLES 7–10

Comparative Experiments E, F, G and H were repeated in entirety, except that the glass fibers had been contacted with N-(2-aminoethyl)-3-aminopropyltrimethoxysilane in the same manner as for Example 2. The relevant data are presented in Table 3.

TABLE 3

| Example | Concentration SDS, mol/l | Average droplet diameter in feed $\mu$m | Kerosene dispersed in feed ppmv | Coalescence efficiency % |
|---|---|---|---|---|
| 7 | 0 | 7.5 | 80 | greater than 99 |
| 8 | 10$^{-6.5}$ | 7.5 | 400 | greater than 99 |
| 9 | 10$^{-5.0}$ | 5.0 | 350 | greater than 99 |
| 10 | 10$^{-2.5}$ | 3 | 310 | 36 |

The coalescence efficiencies in the droplet size range 2.63–3.23 $\mu$m in these four examples were about the same as the overall efficiencies presented in Table 3.

COMPARATIVE EXPERIMENTS I–L

Four experiments were carried out, comparative experiment I without and each of the other three with a different concentration of cetyltrimethylammonium bromide (CTAB). These experiments were repetitions of experiments E, F, G and H, except for the surface active agent. The relevant data are presented in Table 4.

TABLE 4

| Comparative Experiment | Concentration SDS, mol/l | Average droplet diameter in feed μm | Kerosene dispersed in feed ppmv | Coalescence efficiency % |
|---|---|---|---|---|
| I | 0 | 7.5 | 80 | 94.9 |
| J | $10^{-6.5}$ | 7.5 | 340 | 96 |
| K | $10^{-5.0}$ | 6.0 | 320 | 96 |
| L | $10^{-3.5}$ | 4.0 | 320 | 33 |

COMPARATIVE EXPERIMENTS M-O

Comparative Experiments I-L were repeated in entirety, except that the glass fibers had been contacted with N-2-aminoethyl)-3-aminopropyltrimethoxysilane in the same manner as for Example 2. The relevant data are presented in Table 5.

TABLE 5

| Example | Concentration SDS, mol/l | Average droplet diameter in feed μm | Kerosene dispersed in feed ppmv | Coalescence efficiency % |
|---|---|---|---|---|
| 7 | 0 | 7.5 | 80 | greater than 99 |
| M[1] | $10^{-6.5}$ | 7.5 | 340 | 92 |
| N[1] | $10^{-5.0}$ | 6.0 | 320 | 66 |
| O[1] | $10^{-3.5}$ | 4.0 | 320 | 24 |

[1]Comparative experiment

EXAMPLE 11

An experiment was carried out with a coalescer bed consisting of a layer of polypropylene fibers contacted with N-(2-aminoethyl)-3-aminopropyltrimethoxysilane in the manner described in Example 2. The coalescer bed was circle-cylindrical, with a height of 10.1 cm and a width of 9 cm. The layer of fibers was held under pressure by two walls, each provided with a number of openings. The upper wall was displaceable relative to the lower wall and the ends of the fibers were so secured to the lower wall that the fibers could stretch themselves when the upper wall was displaced away from the lower wall. The fibers had a diameter of 30 μm (surface area of 0.148 m²/g). The layer had a bulk density of 126 g/l (porosity of 86%).

The dispersion fed to the coalescer bed contained 300 ppmv of dispersed light crude mineral oil. This feed showed a broad volume/droplet diameter distribution in the range 2-48 μm with a maximum in the range 8-10 μm. The dispersion was passed through the coalescer bed at a linear velocity of 0.75 cm/s for a time of 80 hours. The coalescing efficiency during 80 hours was between 90 and 100%.

COMPARATIVE EXPERIMENT P

Example 11 was repeated in entirety, except that the fibers had not been treated with the silane. The coalescence efficiency was between 50 and 80%.

COMPARATIVE EXPERIMENT Q

Comparative experiment A was repeated in entirety to determine the time dependence of coalescence efficiency; a slightly larger part of the droplets in the feed had a size below 7 μm. The results are stated in Table 6.

TABLE 6

| Run time h | Kerosene dispersed in feed, ppmv | Coalescence efficiency, % |
|---|---|---|
| 0.3 | 72.3 | 26.4 |
| 52 | 115.4 | 42.6 |
| 166 | 48.2 | 60.0 |
| 192 | 161.4 | 76.4 |
| 217 | 184.2 | 80.4 |

After 197 hours of operation the volume/droplet diameter distribution of the product dispersion was about the same as that observed in Comparative Experiment A and gave rise to persistent haziness.

EXAMPLE 12

Example 2 was repeated in entirety—except that the amine-treated fibers were heated at a temperature of 60° C. for 12 hours instead of 120° C. for one hour and that a larger part of the droplets had a size below 7 μm—to determine the time dependence of coalescence efficiency. The results are stated in Table 7.

TABLE 7

| Run time h | Kerosene dispersed in feed, ppmv | Coalescence efficiency, % |
|---|---|---|
| 0.3 | 22.8 | 95.2 |
| 66 | 95.0 | 95 |
| 114 | 96.8 | 99.7 |
| 146 | 162.0 | 97.5 |
| 198 | 93.5 | 94.8 |
| 245 | 16.0 | 97.5 |

After 198 hours of operation the volume/droplet diameter distribution of the product dispersion did not show a maximum and was about a straight line parallel and very close to the abscissa over the range 2.0-12.0 μm, indicating a very efficient removal (more than 95%) of kerosene droplets throughout this size range, including the range 2.0-6.0 μm. The product dispersion was clear. The back pressure remained low over a period of 245 hours of continuous operation, in contrast to the experiment of Example 1. It was after 15 hours of continuous operation that release of coalesced oil droplets was observed. There was no significant buildup of oil on the fibers or in the space between the fibers.

COMPARATIVE EXPERIMENT R

Comparative Experiment A was repeated in entirety, except that the kerosene was replaced by 80 ppmv of the light crude mineral oil of Example 11. The coalescence efficiency was only 43%, measured after 20 min of operation.

EXAMPLE 13

Example 2 was repeated in entirety, except that the kerosene was replaced as described in Comparative Experiment R. The feed contained 80 ppmv of this oil. The coalescence efficiency was more than 95%, measured after 20 min of operation.

COMPARATIVE EXPERIMENT S

Comparative Experiment A was repeated in entirety, except that the kerosene was replaced as described in Comparative Experiment R and the glass fibers by polypropylene fibers having a diameter of 30 μm (bulk density 141.5 g/l, porosity 0.843). The coalescence efficiency was only 10%.

EXAMPLE 14

Comparative Experiment S was repeated in entirety, except that the polypropylene fibers had been treated with N-(2-aminoethyl)-3-aminopropyltrimethoxysilane as described in Example 11. The coalescence efficiency was more than 99%.

COMPARATIVE EXPERIMENT T

The fibers used in this experiment have been prepared as described in Example 1 of British patent application No. 2,038,300.

Clean glass fibers (10 g) were immersed in toluene (1 l) and 3-chloropropyltrimethoxysilane (100 g) was added. The mixture was heated under reflux (temperature about 114° C.) for 3 hours. Any water and methanol liberated was distilled off and collected in a Dean and Stark receiver which was periodically drained. After cooling, the fibers was transferred to a Soxhlet apparatus, extracted with methanol for 24 hours and dried at a pressure of 0.02 bar.

The resulting fibers were added to a solution of OLOA 1200 (280 g; "OLOA 1200" is a trade mark for a polyisobutenyl succinimide, sold by Orobis Limited) dissolved in undecane (800 ml). The mixture was heated under reflux (temperature 180°–185° C.) for 20 hours. After cooling to ambient temperature the supernatant liquid was decanted and the fibers washed with n-heptane. The fibers were then Soxhlet extracted with n-heptane for 24 hours and then with toluene for 24 hours and finally dried at a pressure of 0.02 bar.

The dispersion fed to the coalescer charged with the fibers thus obtained contained 80 ppmv of dispersed kerosene. The coalescence efficiency measured after 20 min was 98%, which is attributed to the positively charged surfaces encountered on the fibers.

After 123 hours of continuous operation the run had to be halted, the bed being blocked with oil leading to a high back pressure.

COMPARATIVE EXPERIMENT U

The fibers prepared as described in Comparative Experiment T were used in an experiment as described in Examples 7–10, using a concentration of SDS of $10^{-4.5}$ mol/l. The coalescence efficiency was 86.5%, which is considerably less than that observed in Example 9 of a similar concentration of SDS.

COMPARATIVE EXPERIMENT V

Nylon fibers were used ("Nylon" is a trade name for a polyamide). These fibers had a diameter between 40 and 60 μm and were used in a bed having a weight of 1 g. The dispersion fed to the bed contained 80 ppmv of dispersed kerosene. The coalescence efficiency was 13%.

EXAMPLE 15

Nylon fibers of Comparative Experiment V contacted with N-(2-aminoethyl)-3-aminopropyltrimethoxysilane were used. This silane was contacted with the fibers in the same manner as described in Example 2. The coalescence efficiency was 34%.

What is claimed is:

1. A process for the separation of two liquids by passing a dispersion of negatively charged droplets of a liquid in an aqueous liquid along the surfaces of a layer of fibers, thus forming coalesced dispersed liquid and, after the aqueous liquid has left the solid material, separating coalesced dispersed liquid from the aqueous liquid, in which process the solid material has been manufactured by contacting fibers of a solid material having active hydrogen atoms in surface groups in the presence of water with a compound of the general formula (I):

in which $R^1$ represents an aliphatic or cycloaliphatic group which contains at least one substituted or unsubstituted amino group, with the group present between the silicon atom and the first nitrogen atom, seen from the silicon atom, being an alkylene group having in the range of from 1 to 5 carbon atoms, wherein said substituted amino group is substituted with 1 or 2 alkyl groups having 1 to 5 carbon atoms, and $R^2$, $R^3$, and $R^4$ represent hydrolyzable alkoxy, aroxy, or cyclo-alkoxy groups having not more than 6 carbon atoms, and said fibers have an average diameter between about 0.5 and 50 microns and are arranged in a layer having a bulk density between about 25 and 200 grams per liter in a layer having a height between about 0.5 and 15 centimeters.

2. A process as claimed in claim 1, in which $R^1$ represents an aliphatic group containing not more than 5 substituted or unsubstituted amino groups.

3. A process as claimed in claim 2, in which $R^1$ contains in the range of from 1 to 15 carbon atoms.

4. A process as claimed in claim 1, in which $R^1$ represents a 3-aminopropyl group.

5. A process as claimed in claim 1, in which $R^1$ contains at least two substituted or unsubstituted amino groups which are separated from each other by means of ethylene groups.

6. A process as claimed in claim 5, in which $R^1$ represents an N-(2-aminoethyl)-3-aminopropyl group.

7. A process as claimed in claim 1, in which $R^2$, $R^3$ and $R^4$ represent methoxy, ethoxy, phenoxy or cyclohexoxy groups.

8. A process as claimed in claim 1, in which the solid material is polypropylene.

9. A process as claimed in claim 1, in which the aqueous liquid contains one or more anionic surface active agents in a concentration of up to $5 \times 10^{-4}$ mol/l.

* * * * *